(12) United States Patent
Hakkarainen et al.

(10) Patent No.: US 8,661,266 B2
(45) Date of Patent: Feb. 25, 2014

(54) SYSTEM AND METHOD FOR SECURE DEVICE KEY STORAGE

(75) Inventors: Harri Hakkarainen, Los Gatos, CA (US); Amer Haider, Saratoga, CA (US); Muhammad Hussain, Saratoga, CA (US); Trent Parker, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 104 days.

(21) Appl. No.: 13/090,882

(22) Filed: Apr. 20, 2011

(65) Prior Publication Data

US 2012/0011373 A1    Jan. 12, 2012

Related U.S. Application Data

(60) Provisional application No. 61/326,546, filed on Apr. 21, 2010.

(51) Int. Cl.
*G06F 11/30*    (2006.01)

(52) U.S. Cl.
USPC ............................................ 713/193; 726/31

(58) Field of Classification Search
None
See application file for complete search history.

(56) References Cited

U.S. PATENT DOCUMENTS

| | | | | |
|---|---|---|---|---|
| 7,668,313 B2* | 2/2010 | Nave | .............................. | 380/259 |
| 8,291,238 B2* | 10/2012 | Ginter et al. | .................... | 713/189 |
| 2010/0031026 A1* | 2/2010 | Cizas et al. | .................... | 713/156 |
| 2010/0313039 A1* | 12/2010 | Ignatius et al. | ................ | 713/189 |
| 2011/0083018 A1* | 4/2011 | Kesanupalli et al. | ......... | 713/186 |
| 2012/0221853 A1* | 8/2012 | Wingert et al. | ............... | 713/160 |
| 2012/0246463 A1* | 9/2012 | Shea et al. | ..................... | 713/153 |

* cited by examiner

*Primary Examiner* — Kambiz Zand
*Assistant Examiner* — Gita Faramarzi
(74) *Attorney, Agent, or Firm* — Cooley LLP

(57) ABSTRACT

Disclosed are systems and methods for protecting secret device keys, such as High-bandwidth Digital Content Protection (HDCP) device keys. Instead of storing secret device keys in the plain, a security algorithm and one or more protection keys are stored on the device. The security algorithm is applied to the secret device keys and the one or more protection keys to produce encrypted secret device keys. The encrypted secret device keys are then stored either on chip or off-chip.

7 Claims, 12 Drawing Sheets

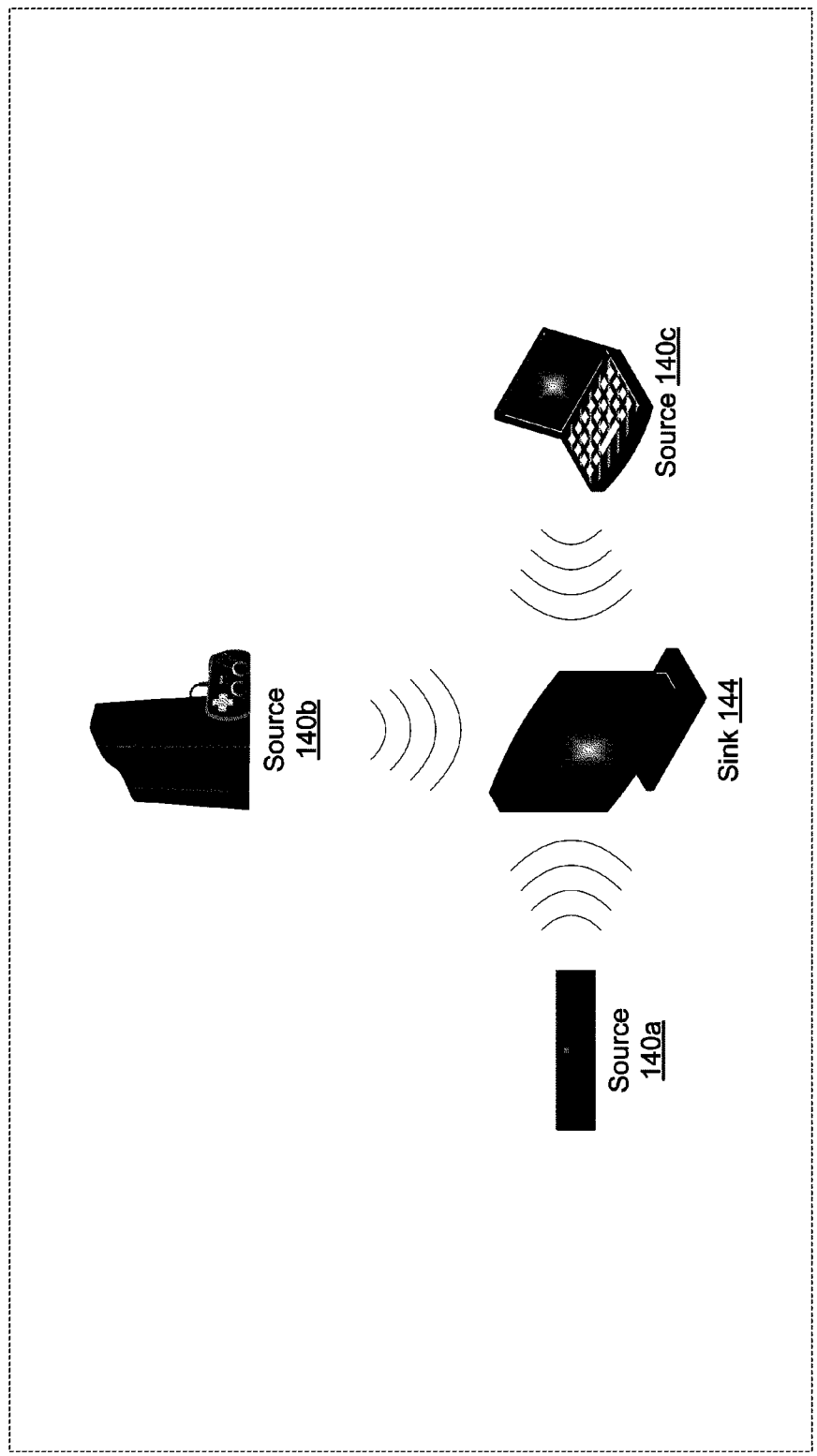

SYSTEM AND METHOD FOR SECURE DEVICE KEY STORAGE

CROSS REFERENCE TO RELATED APPLICATIONS

This application claims the benefit of U.S. Provisional Application No. 61/326,546, filed Apr. 21, 2010.

COPYRIGHT NOTICE

A portion of the disclosure of this patent document contains material that may be subject to copyright protection. The copyright owner has no objection to the facsimile reproduction by anyone of the patent document or the patent disclosure as it appears in the Patent and Trademark Office patent file or records, but otherwise reserves all copyright rights.

TECHNICAL FIELD

The present application relates to authentication using secure secret keys. More specifically, the present application relates to secure storage of secret keys, such as HDCP 2.0 device keys.

BACKGROUND

Authentication using digital certificates and public/private key pairs has gained wide popularity in a variety of applications. In a public/private key cryptographic application, digital content may be encrypted using a public key. Only a user or device in possession of the corresponding private key may decrypt the resulting encrypted digital content. Authentication between users and/or devices may also be achieved using public/private key pairs using well-known challenge and response techniques. Private keys may be stored on devices utilizing public/private key cryptography for authentication and encryption/decryption of digital content.

Digital content protection schemes have been implemented in consumer electronics devices to provide copy protection of digital audio and video content. For example, High-bandwidth Digital Content Protection (HDCP), developed by Intel Corporation, prevents copying of digital audio and video content as it travels across High-Definition Multimedia Interface (HDMI), Digital Visual Interface (DVI), DisplayPort, Gigabit Video Interface (GVI), or Unified Display Interface (UDI) connections. Implementing HDCP requires a license from Digital Content Protection, LLP (a subsidiary of Intel). The HDCP scheme involves three basic processes to achieve various goals as listed below:

1. authentication: authentication of devices prevents non-licensed devices from receiving content;
2. encryption: encryption of the content data stream prevents eavesdropping; and
3. key revocation: key revocation processes ensure that devices that have been compromised and/or cloned can be blocked from receiving content.

The HDCP scheme therefore requires the use of public keys and certificates issued by DCP as well as secret device keys. Each HDCP-capable device has a unique set of keys. Device keys are exchanged during authentication. Also, keys are shared to encrypt and decrypt content.

There are three types of devices that may use HDCP. Each device contains one or more HDCP transmitters and/or receivers. Sources send content to be displayed. Examples of sources include DVD players, Blu-ray players, set-top boxes, gaming consoles, and computer video cards. Sources have one or more HDCP transmitters Sinks render the content for display and cannot transmit content to other devices. Sinks therefore have only receivers. Examples of sinks include HDTV s and LCD monitors. Repeaters accept content, decrypt it, then re-encrypt and retransmit the data. Repeaters have both receivers and transmitters. An example of a repeater is an A/V receiver.

FIG. 1A illustrates a simple home-theater arrangement utilizing High-bandwidth Digital Content Protection (HDCP) over a traditional wired connection. As shown, system 10 comprises a source 100 and a sink 104, coupled by HDMI connection 102. Source 100 (shown here as a DVD player) includes device-specific HDCP keys, which may be stored in an HDMI chip on the device. Sink 104 (shown here as an LCD TV) includes device-specific HDCP keys, which may be stored in an HDMI chip on the device. Key exchange occurs over the HDMI connection 102 and encrypted content travels across this connection.

The desire to allow consumers to connect displays, devices, and home-theater equipment using standard protocols and interfaces such as TCP/IP, WiFi, USB, and Wireless Home Digital Interface (WHDI) has led to revisions of the HDCP standard specifications. HDCP revision 2.0 defines an interoperable method for supporting such emerging usage models.

FIG. 1B illustrates a home-theater arrangement utilizing HDCP 2.0 over a wireless network. As shown, system 12 comprises a source 120 and multiple sinks 124a, 124b, and 124c. Source 100 (shown here as a DVD player) transmits content to sinks 124a, 124b, and 124c (shown here as HDTVs) over wireless network connections 122a, 122b, and 122c (not labeled). Key exchange occurs over wireless network connections 122a, 122b, and 122c and encrypted content travels across these connections. Each of the devices 120, 124a, 124b, and 124c includes device-specific HDCP keys that may be stored on the device.

FIG. 1C illustrates a home-theater arrangement utilizing HDCP 2.0 over a wireless network. As shown, system 14 comprises multiple sources 140a, 140b, and 140c and sink 144. Sources 140a, 140b, and 140c (shown here as a DVD player, a gaming console, and a notebook computer) transmit content to sink 144 (shown here as a HDTV) over wireless network connections 142a, 142b, and 142c (not labeled). Key exchange occurs over wireless network connections 142a, 142b, and 142c and encrypted content travels across these connections. Each of the devices 120a, 120b, 120c and 124 includes device-specific HDCP keys that may be stored on the device.

FIG. 1D illustrates a home-theater arrangement utilizing HDCP 2.0 over a mixed network including wired connections and wireless connections. As shown, system 16 comprises source 160, converter/repeater 166, and sink 164. Source 160 (shown here as a DVD player) transmits content to converter repeater 166 (shown here as an A/V receiver) over TCP/IP connection 162. Converter/repeater 166 decrypts content received from source 160, re-encrypts it, retransmits to sink 164 over wireless network connection 168 (not labeled), and also performs protocol conversions. Key exchange occurs between source 160 and converter/repeater 166 over TCP/IP connection 162 and encrypted content travels across this connection. Key exchange occurs between converter/repeater 166 and sink 164 over wireless network connection 168 and encrypted content travels across this connection. Each of the devices 160, 164, and 166 includes device-specific HDCP keys that may be stored on the device.

In all scenarios depicted in FIGS. 1A-1D, security of the device-specific secret keys is paramount. There are two basic security concerns: (1) protecting device-specific secret keys during incorporation into a device or system (i.e., during device manufacturing and production), and (2) protecting the device-specific secret keys for use during transmission and reception of HDCP-protected content. Thus there is a need for a solution to address both of these security concerns.

SUMMARY

In one embodiment of the invention, plain secret device keys are not stored on a device. Instead, a security algorithm and one or more protection keys are stored on the device. The security algorithm is applied to the plain secret device keys and the one or more protection keys to produce encrypted secret device keys. The encrypted secret device keys are stored on the device.

In another embodiment of the invention, plain secret device keys are not stored on a device. Instead, a security algorithm and one or more protection keys are stored on the device. The security algorithm is applied to the plain secret device keys and the one or more protection keys to produce encrypted device keys. The encrypted secret device keys are stored off the device in a system incorporating the device.

In another embodiment of the invention, a method of protecting a secret device key is disclosed. The method includes providing a security algorithm module configured to store a security algorithm, providing a protection key module configured to store a protection key, and providing an encrypted device key module configured to store an encrypted secret device key generated by applying the security algorithm to a secret device key and utilizing the protection key. The security algorithm may be hardwired in logic gates or in a programmable module in a device chip. The security algorithm may be one of RSA or AES encryption. Providing a protection key module may comprise implementing a bit sequence representing a protection key in one of an EFUSE, an EEPROM, or logic gates in a device chip. Alternatively, providing a protection key module may comprise providing a programmable device. The encrypted device key module may be provided on a chip that also comprises the security algorithm module or it may not be provided on a chip that also comprises the security algorithm module. The method may further comprise additional steps including storing a security algorithm in the security algorithm module, storing a protection key in the protection key module, receiving an unencrypted secret device key, applying the security algorithm to the unencrypted secret device key utilizing the protection key to obtain an encrypted secret device key, and storing the encrypted secret device key in the encrypted device key module.

In another embodiment of the invention, a system is disclosed that comprises a security algorithm module configured to store a security algorithm, a protection key module configured to store a protection key, and an encrypted device key module configured to store an encrypted secret device key generated by applying the security algorithm to a secret device key and utilizing the protection key. The security algorithm may be hardwired in logic gates or in a programmable module in a device chip. The security algorithm may utilize one of RSA or AES encryption. The protection key module may comprise one of an EFUSE, an EEPROM, or logic gates in a device chip. Alternatively, the protection key module may comprise a programmable device. The encrypted device key module may be provided on a chip that also comprises the security algorithm module or it may not be provided on a chip that also comprises the security algorithm module. The security algorithm module may further comprise a device-specific key and the security algorithm module may be further configured to utilize the device-specific key to generate the encrypted secret device key. The device-specific key may be a non-software-readable key.

In another embodiment of the invention, a method of protecting a secret device key is disclosed. The method comprises providing a security algorithm module comprising a security algorithm and a non-software-readable device-specific key and providing a protection key module configured to store a protection key. The security algorithm module may be configured to encrypt a secret device key by applying the security algorithm to the secret device key, the non-software-readable device specific key, and the protection key. The security algorithm may be hardwired in logic gates or in a programmable module in a device chip. The security algorithm may utilize one of RSA or AES encryption. Providing a protection key module may comprise implementing a bit sequence representing a protection key in one of an EFUSE, an EEPROM, or logic gates in a device chip. Alternatively, providing a protection key module may comprise providing a programmable device. The method may further comprise additional steps including storing a protection key in the protection key module, providing an encrypted device key module configured to store the encrypted secret device key. The encrypted device key module may be provided on a chip that also comprises the security algorithm module or it may not be provided on a chip that also comprises the security algorithm module. The method may further comprise additional steps including receiving an unencrypted secret device key, applying the security algorithm to the unencrypted secret device key utilizing the device-specific key and the protection key to obtain an encrypted secret device key, and storing the encrypted secret device key in an encrypted device key module.

In another embodiment of the invention, a system is disclosed comprising a security algorithm module comprising a security algorithm and a non-software-readable device-specific key, and a protection key module configured to store a protection key. The system may further comprise an encrypted device key module configured to store an encrypted secret device key generated by applying the security algorithm to an unencrypted secret device key and utilizing the device-specific key and the protection key. The security algorithm may be hardwired in logic gates or in a programmable module in a device chip. The security algorithm may utilize one of RSA or AES encryption. The protection key module may comprise one of an EFUSE, an EEPROM, or logic gates in a device chip. Alternatively, the protection key module may comprise a programmable device. The encrypted device key module is provided on a chip that also comprises the security algorithm module or it may not be provided on a chip that also comprises the security algorithm module.

BRIEF DESCRIPTION OF DRAWINGS

The foregoing summary, as well as the following detailed description, will be better understood when read in conjunction with the appended drawings. For the purpose of illustrating the invention, there are shown in the drawings examples that are presently preferred. It should be understood, however, that the invention is not limited to the precise arrangements and instrumentalities shown. In the drawings:

FIG. 1C illustrates a home-theater arrangement utilizing HDCP 2.0 over a wireless network;

DETAILED DESCRIPTION

Reference will now be made in detail to the present examples of the invention illustrated in the accompanying drawings. Wherever possible, the same reference numbers will be used throughout the drawings to refer to the same or like elements.

Figure 1A:
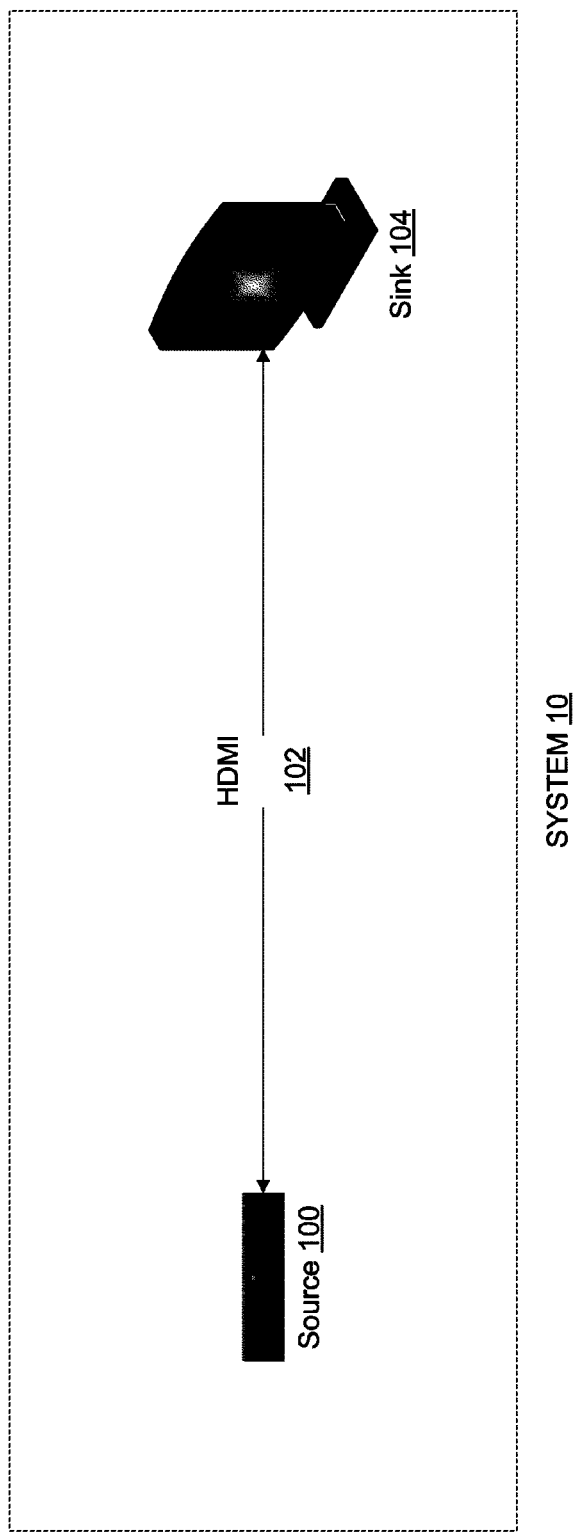
FIG. 1A illustrates a simple home-theater arrangement utilizing High-bandwidth Digital Content Protection (HDCP) over a traditional wired connection.
Figure 1B:
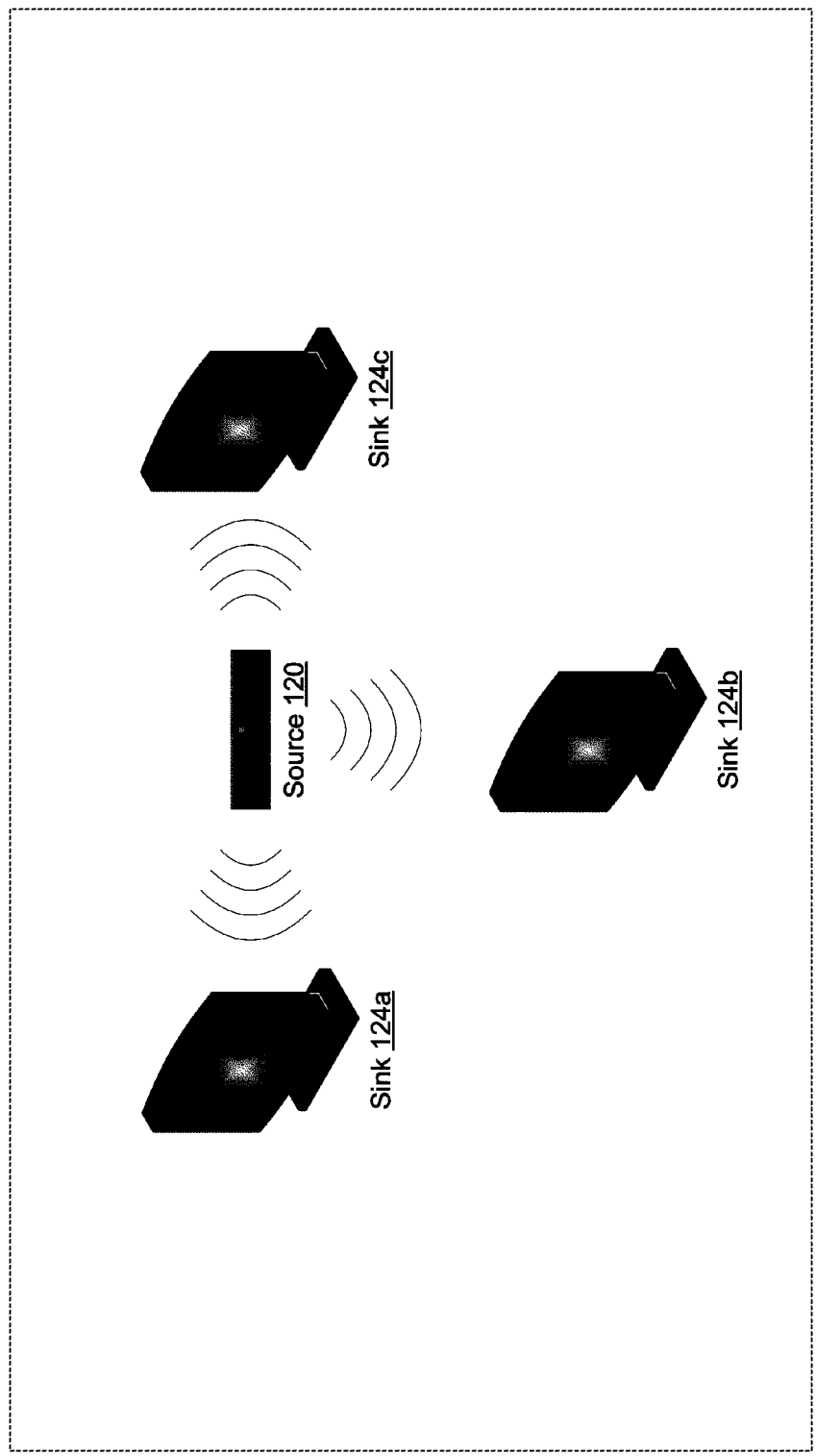
FIG. 1B illustrates a home-theater arrangement utilizing HDCP 2.0 over a wireless network.
Figure 1D:
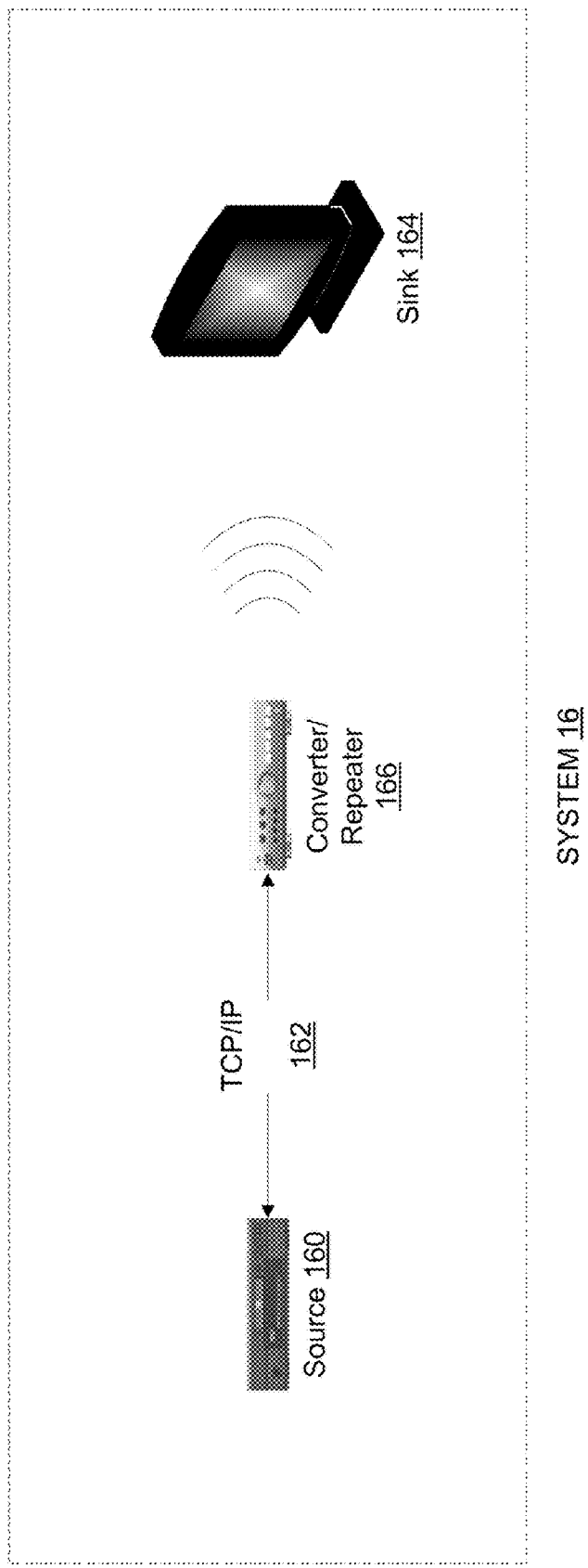
FIG. 1D illustrates a home-theater arrangement utilizing HDCP 2.0 over a mixed network including wired connections and wireless connections.
Figure 2:
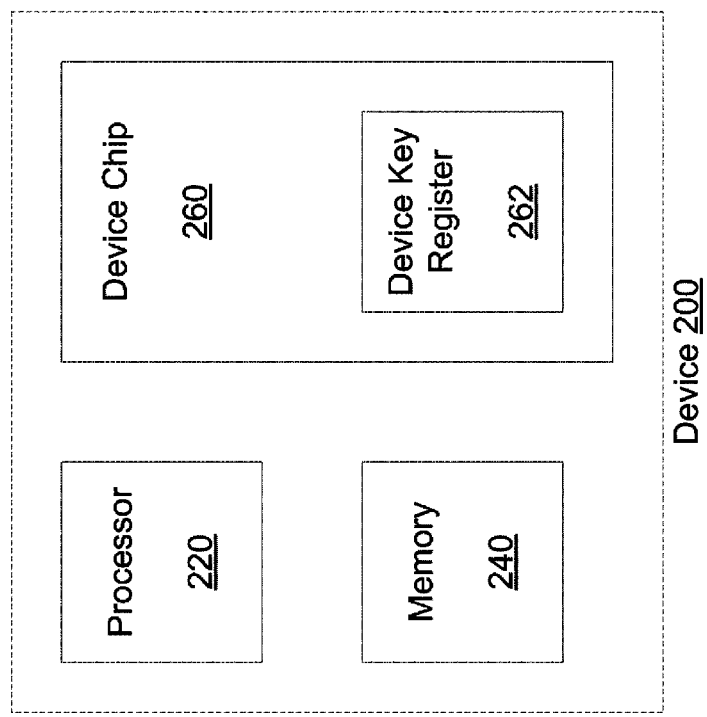
FIG. 2 illustrates a prior art system with unsecured storage of secret keys.

FIG. 2 illustrates a prior art system with unsecured storage of secret keys. In FIG. 2, device 200 comprises processor 220, memory 240, and device chip 260. Processor 220 may be, for example, a general or special purpose microprocessor, application specific integrated circuit (ASIC), or other programmable module. Memory 240 may be any non-volatile memory storage device or circuits including EEPROM, flash memory, and the like. Device chip 260 further comprises device key register 262. Device chip 260 may be any special-purpose chip such as, for example, an HDMI chip. Device key register 262 may be any non-volatile memory storage device or circuits such as, for example, EEPROM and EFUSE devices. Device key register 262 stores secret device keys such as, for example, HDCP device keys. Secret device keys are "burned" or programmed into device key register 262 at the time of chip manufacturing.

A problem with the prior art system of FIG. 2 is that the secret device keys stored in device key register 262 are not secure. If device chip 260 is removed from device 200, the contents of device key register 262 may be ascertained and/or copied. For example, if device key register 262 is an EFUSE device, the bit pattern stored therein may be easily ascertained using an x-ray device. Device 200 may then be cloned.

Figure 3:
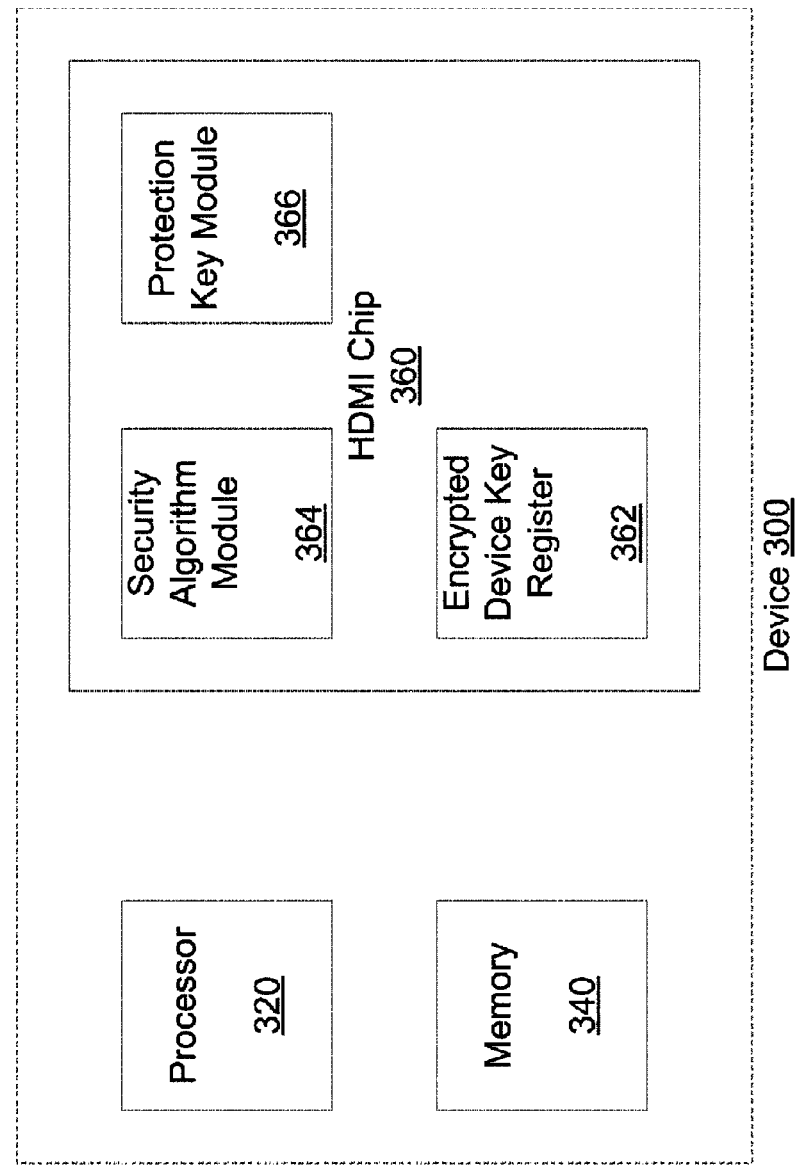
FIG. 3 illustrates a system with secured on-chip storage of secret keys according to an embodiment of the invention.

FIG. 3 illustrates a system with secured on-chip storage of secret keys according to an embodiment of the invention. In FIG. 3, device 300 comprises processor 320, memory 340, and device chip 360, shown here as HDMI chip 360. Processor 320 and memory 340 correspond to processor 220 and memory 240 of FIG. 2, respectively. HDMI chip 360 further comprises encrypted device key register 362, security algorithm module 364, and protection key module 366. Encrypted device key register 362 may be any non-volatile memory storage device or circuits such as, for example, EEPROM and EFUSE devices. Encrypted device key register 362 stores encrypted secret device keys such as, for example, HDCP device keys. The encrypted secret device keys are "burned" or programmed into encrypted device key register 362 at the time of chip manufacturing as will be described. Security algorithm module 364 is a hardware or software module that includes a security algorithm ("ALG") and a device specific key ("DSK"). The security algorithm may utilize, for example, RSA or AES encryption. The security algorithm module 364 may be hardwired in logic gates, a programmable engine, or a combination of both. Protection key module 366 stores one or more protection keys that may be supplied, for example, by the chip manufacturer, a system manufacturer, or both. A protection key may be, for example, a unique secret bit sequence similar to a secret device key or other cryptographic key. Protection key module 366 may be implemented in an EFUSE or EEPROM or logic gates and/or device microcode or software at the time of chip manufacturing or during end-system production or provisioned in the field.

Encrypted device key register 362 stores an encrypted secret device key as follows: security algorithm module 364 applies its security algorithm to a non-encrypted secret device key, and the one or more protection keys stored in protection key module 366. For example, protection key module 366 may store two protection keys. The first one, supplied by the chip manufacturer, may be called the chipmaker protection key ("CPK"). The second protection key, supplied by the system manufacturer, may be called the customer security key ("CSK"). In this example, an unencrypted secret device key ("DK"), the CPK, and CSK are all used by the security algorithm module 364, which outputs an encrypted device key ("EDK") as given below:

$$EDK=ALG[DK, CPK, CSK, DSK]$$

The encrypted secret device keys are "burned" or programmed into encrypted device key register 362 at the time of chip manufacturing or logic gates and/or device microcode or software at the time of chip manufacturing or during end-system production or provisioned in the field.

Instead of storing the secret device keys in the plain, encrypted secret device keys are stored on the HDMI chip 360 along with a security algorithm and one or more protection keys. This increases security of the secret device keys. Also, security is further enhanced because the encrypted secret device keys, security algorithm, and one or more protection keys (CSK, DSK, CPK) may be stored in multiple locations or forms on the chip in logic gates and/or non-volatile memory.

Figure 4:
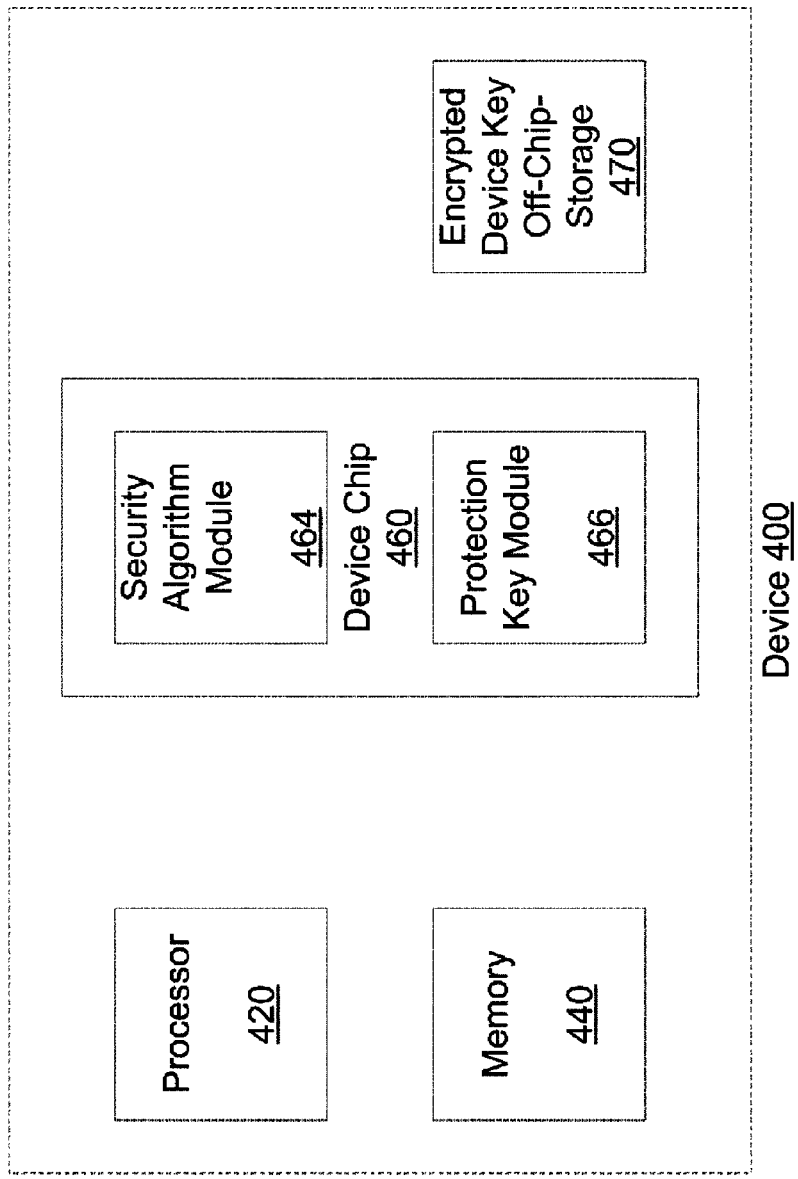
FIG. 4 illustrates a system with secured off-chip storage of secret keys according to an embodiment of the present invention.

FIG. 4 illustrates a system with secured off-chip storage of secret keys according to an embodiment of the present invention. In FIG. 4, device 400 comprises processor 420, memory 440, and device chip 460, and encrypted device key off-chip-storage 470. Processor 420 and memory 440 correspond to processor 420 and memory 440 of FIG. 2, respectively. Device chip 460 further comprises security algorithm module 464, and protection key module 466. Encrypted device key off-chip-storage 470 may be any non-volatile memory storage device or circuits such as, for example, EEPROM, Flash, harddrive, FPGA and EFUSE devices. Encrypted device key off-chip-storage 470 stores encrypted secret device keys such as, for example, HDCP device keys. The encrypted secret device keys are "burned" or programmed into encrypted device key off-chip-storage 470 at any time by a system manufacturer after the time of chip manufacturing (for device chip 460) as will be described. Security algorithm module 464 is a hardware or software module that includes a security algorithm ("ALG") and device specific key ("DSK"). The security algorithm may utilize, for example, RSA or AES encryption. The security algorithm module 464 may be hardwired in logic gates, a programmable engine, or a combination of both. Protection key module 466 stores one or more protection keys that may be supplied, for example, by the chip manufacturer, a system manufacturer, or both. A protection key may be, for example, a unique secret bit sequence similar to a secret device key or other cryptographic key. Protection key module 466 may be implemented in an EFUSE or EEPROM or logic gates at the time of chip manufacturing or logic gates and/or device microcode or software at the time of chip manufacturing or during end-system production or provisioned in the field.

Encrypted device key off-chip-storage 470 stores an encrypted secret device key as follows: security algorithm module 464 applies its security algorithm to a non-encrypted secret device key, and the one or more protection keys stored in protection key module 466. For example, protection key module 466 may store two protection keys. The first one, supplied by the chip manufacturer, may be called the chipmaker protection key ("CPK"). The second protection key, supplied by the system manufacturer, may be called the customer security key ("CSK"). In this example, an unencrypted secret device key ("DK"), the CPK, and CSK are all used by the security algorithm module 464, which outputs an encrypted device key ("EDK") as given below:

$$EDK = ALG[DK, CPK, CSK, DSK]$$

As with the system of FIG. 3, security of the secret device keys is enhanced because the secret device keys are not directly stored in the plain. Instead, a security algorithm and one or more protection keys are stored on the device chip 460 that protect the secret device keys residing in encrypted form in the encrypted device key off-chip-storage. Also, security is further enhanced because the encrypted secret device keys, security algorithm, and one or more protection keys (CSK, DSK, CPK) may be stored in multiple locations or forms on the chip in logic gates and/or non-volatile memory.

Figure 5:
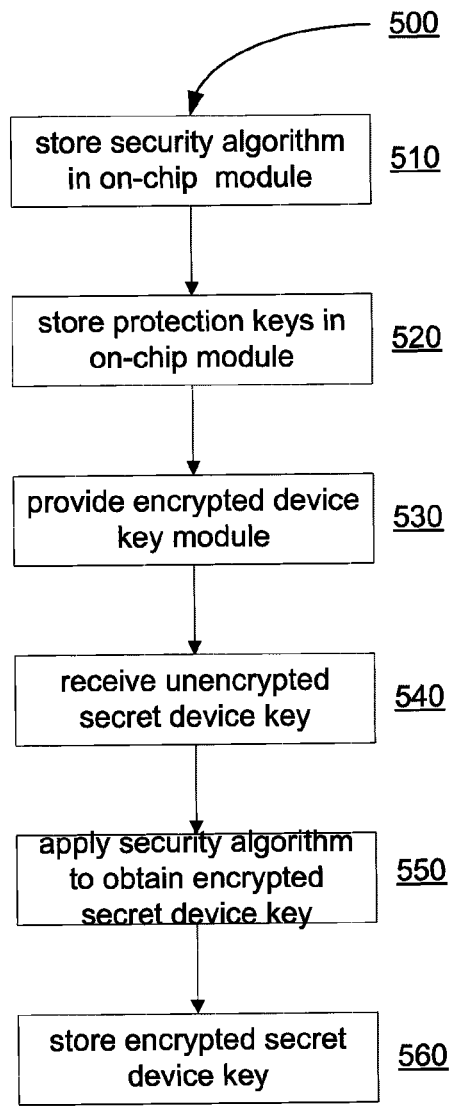
FIG. 5 illustrates a method for protecting a secret device key according to an embodiment of the invention.

FIG. 5 illustrates a method for protecting a secret device key according to an embodiment of the invention. FIG. 5 illustrates, for example, steps that may be included during a chip manufacturing process. In other embodiments, one or more of the steps in FIG. 5 may be implemented after the chip manufacturing process. For example, one or more steps may be implemented by a system manufacturer during end-system production. The method 500 begins at step 510 with storing a security algorithm in an on-chip module. A security algorithm module is configured to store a security algorithm that may be hardwired in logic gates, provided in a programmable engine, or a combination of both. That is, the security algorithm may be stored in the security algorithm module at the time of chip manufacturing, or it may be stored after the time of chip manufacturing. In other embodiments, a security algorithm may be stored at the time of chip manufacturing and the particular security algorithm may be updated or supplemented by storing an additional security algorithm. The security algorithm may utilize, for example, RSA or AES encryption. The security algorithm module may also be configured to store a device specific key. The device specific key may be, for example, a non-software-readable key that is hardwired in logic gates at the time of chip manufacturing. The method continues at step 520 with storing protection keys in an on-chip module. A protection key module is configured to store one or more protection keys that may be supplied, for example, by the chip manufacturer, a system manufacturer, or both. A protection key may be, for example, a unique secret bit sequence similar to a secret device key or other cryptographic key. The protection key module may be implemented, for example, in an EFUSE, EEPROM, logic gates or a combination of logic gates and/or device microcode or software. This step may be implemented at the time of chip manufacturing, after the time of chip manufacturing, or at both times. The method continues at step 530 with providing an encrypted device key module. The encrypted device key module is configured to store an encrypted device key generated by applying the security algorithm to a secret device key utilizing a protection key stored in the protection key module. The encrypted device key module may be, for example, a memory register provided at the time of chip manufacturing on the same device chip as the security algorithm module and protection key module. In other embodiments, the encrypted device key module may be any non-volatile memory storage device or circuits provided by a system manufacturer during end-system production, such as, for example, EEPROM, Flash, hard drive, FPGA and EFUSE devices. The method continues at step 550 with receiving an unencrypted secret device key such as an HDCP device key. The method continues at step 560 with applying the stored security algorithm to obtain an encrypted secret device key. The stored security algorithm is applied to the unencrypted secret device key, the one or more protection keys stored in the protection key module, and any device specific key stored in the security algorithm module. The method ends at step 570 with storing the encrypted device key. The encrypted secret device key may be stored, for example, on the same device chip as the security algorithm module and the protection key module either at the time of chip manufacturing. Alternatively, the encrypted secret device key may be stored either in an on-chip storage or in an off-chip storage by a system manufacturer during end-system production.

Figure 6:
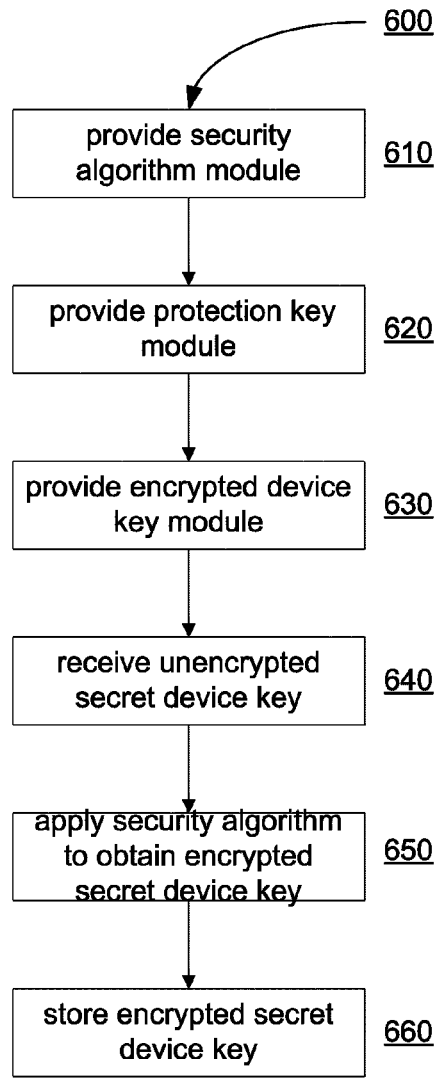
FIG. 6 illustrates a method for secured on-chip storage of a secret key according to an embodiment of the invention.

FIG. 6 illustrates a method for secured on-chip storage of a secret key according to an embodiment of the invention. An encrypted version of the secret key is stored on-chip during a chip manufacturing process. The method 600 begins at step 610 with providing a security algorithm module such as the security algorithm module 364 of FIG. 3. The method continues at step 620 with providing a protection key module such as the protection key module 366 of FIG. 3. The method continues at step 630 with providing an encrypted device key module, such as the encrypted device key register 362 of FIG. 3. The method continues at step 640 with receiving an unencrypted secret device key such as an HDCP key. The unencrypted secret device key is associated with a device chip that includes the security algorithm module, the protection key module, and the encrypted device key module. The method continues at step 650 with applying the security algorithm to obtain an encrypted secret device key. This step may utilize keys including a device specific key and any protection keys stored in the protection key module. The method ends at step 660 with storing the encrypted device key in the encrypted device key module. In this example, the security algorithm and any device specific key stored in the security algorithm module, the one or more protection keys stored in the protection key module, and the encrypted secret device key are all stored (i.e., hard-wired, burned, or programmed) on a single device chip during the chip manufacturing process, including during wafer testing.

Figure 7:
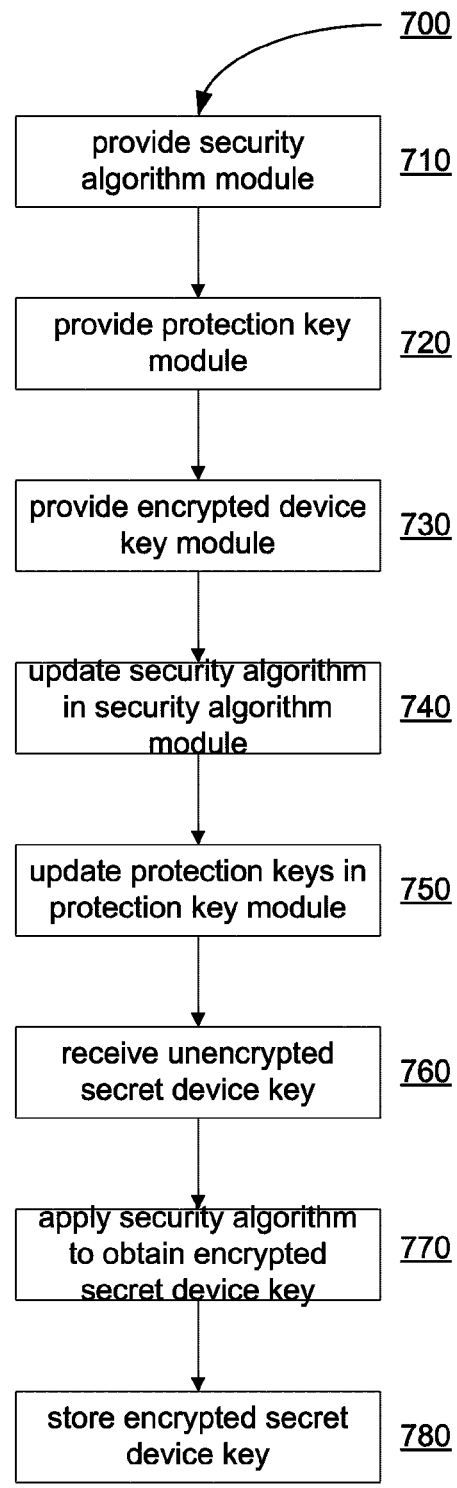
FIG. 7 illustrates a method for secured on-chip storage of a secret key according to an embodiment of the invention.

FIG. 7 illustrates a method for secured on-chip storage of a secret key according to an embodiment of the invention. An encrypted version of the secret key is stored on-chip after a chip manufacturing process such as during end-system production by a system manufacturer. The method 700 begins at step 710 with providing a security algorithm module such as the security algorithm module 364 of FIG. 3. The security algorithm module may be programmed with a security algorithm and a device specific key stored during a chip manufacturing process. Alternatively, the security algorithm module may be implemented as a programmable engine (either in hardware or software/microcode) with no stored security algorithm or as a combination of hard-wired circuitry and programmable logic circuits configured to store a security algorithm and a device specific key. That is, the security algorithm module may be initially configured with or without a stored security algorithm and device specific key. The security algorithm module may later be updated with a new or supplemental security algorithm and device specific key. The method continues at step 720 with providing a protection key module such as the protection key module 366 of FIG. 3. The protection key module may be programmed with one or more protection keys stored during the chip manufacturing process. Alternatively, the protection key module may be implemented as a programmable engine or as a combination of hard-wired circuitry and programmable logic circuits configured to store one or more protection keys. That is, the protection key module may be initially configured with or without stored protection keys. The protection key module may later be updated with one or more new or supplemental protection keys. The method continues at step 730 with providing an encrypted device key module, such as the encrypted device key register 362 of FIG. 3. The method continues at step 740 with updating the security algorithm in the security algorithm module. For example, a new or supplemental security algorithm and device specific key may be stored after the chip manufacturing process such as during end-system production by a system manufacturer. The method continues at step 750 with updating the protection keys in the protection key module. For example, one or more new or supplemental protection keys may be stored after the chip manufacturing process such as during end-system production by a system manufacturer. The method continues at step 760 with receiving an unencrypted secret device key such as an HDCP key. The unencrypted secret device key is associated with a device chip that includes the security algorithm module, the protection key module, and the encrypted device key module. The method continues at step 770 with applying the security algorithm to obtain an encrypted secret device key. This step may utilize keys including a device specific key and any protection keys stored in the protection key module. The method ends at step 780 with storing the encrypted device key in the encrypted device key module. In this example, the security algorithm and any device specific key stored in the security algorithm module, the one or more protection keys stored in the protection key module, and the encrypted secret device key may all be stored on a single device chip after the chip manufacturing process such as during end-system production by a system manufacturer. Also, the security algorithm, device specific key, protection keys, and encrypted secret device key may be updated at any other time, allowing infield upgrade ability and replacement of keys.

Figure 8:
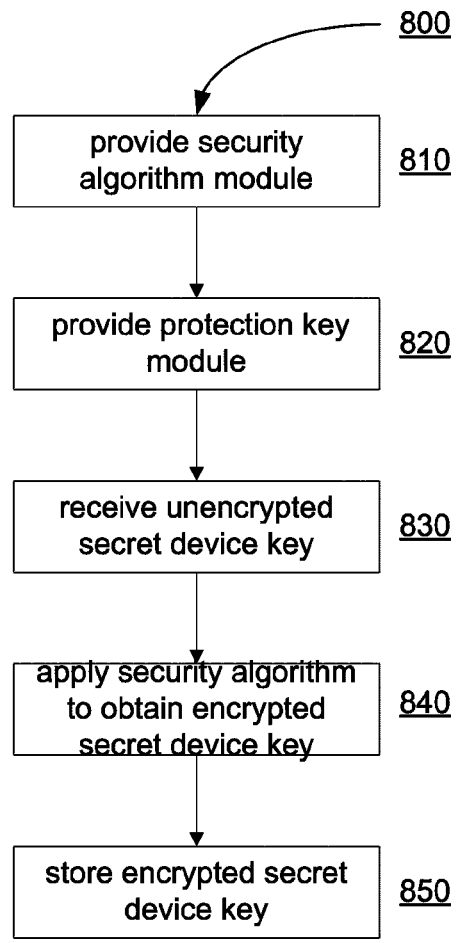
FIG. 8 illustrates a method for secured off-chip storage of a secret key according to an embodiment of the invention.

FIG. 8 illustrates a method for secured off-chip storage of a secret key according to an embodiment of the invention. An encrypted version of the secret key is stored off-chip after a chip manufacturing process such as during end-system production by a system manufacturer. The method 800 begins at step 810 with providing a security algorithm module such as the security algorithm module 464 of FIG. 4. The method continues at step 820 with providing a protection key module such as the protection key module 466 of FIG. 4. The method continues at step 830 with receiving an unencrypted secret device key such as an HDCP key. The unencrypted secret device key is associated with a device chip that includes the security algorithm module and the protection key module. The method continues at step 840 with applying the security algorithm to obtain an encrypted secret device key. This step may utilize keys including a device specific key and any protection keys stored in the protection key module. The method ends at step 850 with storing the encrypted device key. The encrypted device key is stored off-chip, such as in the encrypted device key off chip storage 470 of FIG. 4. In this example, the security algorithm and any device specific key stored in the security algorithm module as well as the one or more protection keys stored in the protection key module are all stored (i.e., hard-wired, burned, or programmed) on a single device chip during the chip manufacturing process, including during wafer testing. The encrypted secret device key is stored off-chip after the chip manufacturing process such as during end-system production by a system manufacturer.

Figure 9:
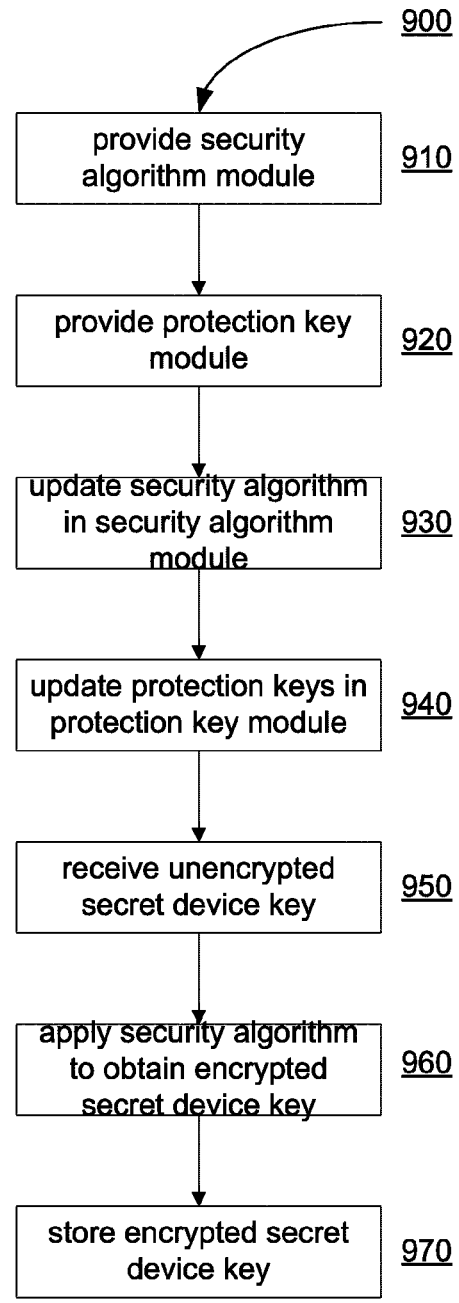
FIG. 9 illustrates a method for secured off-chip storage of a secret key according to an embodiment of the invention.

FIG. 9 illustrates a method for secured off-chip storage of a secret key according to an embodiment of the invention. An encrypted version of the secret key is stored off-chip after a chip manufacturing process such as during end-system production by a system manufacturer. The method 900 begins at step 910 with providing a security algorithm module such as the security algorithm module 464 of FIG. 4. The security algorithm module may be programmed with a security algorithm and a device specific key stored during a chip manufacturing process. Alternatively, the security algorithm module may be implemented as a programmable engine (either in hardware or software/microcode) with no stored security algorithm or as a combination of hard-wired circuitry and programmable logic circuits configured to store a security algorithm and a device specific key. That is, the security algorithm module may be initially configured with or without a stored security algorithm and device specific key. The security algorithm module may later be updated with a new or supplemental security algorithm and device specific key. The method continues at step 920 with providing a protection key module such as the protection key module 466 of FIG. 4. The protection key module may be programmed with one or more protection keys stored during the chip manufacturing process. Alternatively, the protection key module may be implemented as a programmable engine or as a combination of hard-wired circuitry and programmable logic circuits configured to store one or more protection keys. That is, the protection key module may be initially configured with or without stored protection keys. The protection key module may later be updated with one or more new or supplemental protection keys. The method continues at step 930 with updating the security algorithm in the security algorithm module. For example, a new or supplemental security algorithm and device specific key may be stored after the chip manufacturing process such as during end-system production by a system manufacturer. The method continues at step 940 with updating the protection keys in the protection key module. For example, one or more new or supplemental protection keys may be stored after the chip manufacturing process such as during end-system production by a system manufacturer. The method continues at step 950 with receiving an unencrypted secret device key such as an HDCP key. The unencrypted secret device key is associated with a device chip that includes the security algorithm module, the protection key module, and the encrypted device key module. The method continues at step 960 with applying the security algorithm to obtain an encrypted secret device key. This step may utilize keys including a device specific key and any protection keys stored in the protection key module. The method ends at step 970 with storing the encrypted device key. The encrypted device key is stored off-chip, such as in the encrypted device key off chip storage 470 of FIG. 4. In this example, the security algorithm and any device specific key stored in the security algorithm module as well as the one or more protection keys stored in the protection key module may all be stored on a single device chip after the chip manufacturing process such as during end-system production by a system manufacturer. The encrypted secret device key is stored off-chip after the chip manufacturing process such as during end-system production by a system manufacturer. Also, the security algorithm, device specific key, protection keys, and encrypted secret device key may be updated at any other time, allowing in-field upgradeability and replacement of keys.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. A hardware component, comprising:
an encrypted secret device key stored in an encrypted device key register, wherein the encrypted secret device key is derived from a security algorithm executed by the hardware component to process a device specific key, a first protection key, a second protection key and a secret device key, wherein at least two keys are installed in the hardware component by different entities, such that the security algorithm is operative on at least two keys installed by different entities.

2. The hardware component of claim 1 wherein the first protection key is a chip maker protection key installed by a chip maker.

3. The hardware component of claim 1 wherein the second protection key is a system manufacturer security key installed by a system manufacturer.

4. The hardware component of claim 1 wherein the security algorithm is implemented with logic gates on the hardware component.

5. The hardware component of claim 1 wherein the security algorithm is implemented as a programmable module executed by a processor on the hardware component.

6. The hardware component of claim 1 wherein the security algorithm utilizes RSA encryption.

7. The hardware component of claim 1 wherein the security algorithm utilizes AES encryption.

\* \* \* \* \*